(12) United States Patent
Wang et al.

(10) Patent No.: US 11,644,835 B2
(45) Date of Patent: May 9, 2023

(54) GAME-THEORETIC PLANNING FOR RISK-AWARE INTERACTIVE AGENTS

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Mingyu Wang, Stanford, CA (US); Negar Zahedi Mehr, Stanford, CA (US); Adrien David Gaidon, Mountain View, CA (US); Mac Schwager, San Francisco, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 135 days.

(21) Appl. No.: 16/942,560

(22) Filed: Jul. 29, 2020

(65) Prior Publication Data
US 2022/0032960 A1 Feb. 3, 2022

(51) Int. Cl.
*G05D 1/00* (2006.01)
*B60W 60/00* (2020.01)
(Continued)

(52) U.S. Cl.
CPC ....... *G05D 1/0088* (2013.01); *B60W 30/0956* (2013.01); *B60W 30/16* (2013.01);
(Continued)

(58) Field of Classification Search
CPC ......... B60W 60/0025; B60W 30/0953; B60W 30/0956; B60W 30/18163;
(Continued)

(56) References Cited

U.S. PATENT DOCUMENTS 9,551,993 B2 * 1/2017 Kolhouse ............. G05D 1/0293
9,666,079 B2 * 5/2017 Lokesh ................. B60W 30/16
(Continued)

FOREIGN PATENT DOCUMENTS

| CN | 110867097 A | * | 3/2020 | |
| JP | 2018034549 A | * | 3/2018 | |
| WO | WO-2020092635 A1 | * | 5/2020 | ............ B60W 50/02 |

OTHER PUBLICATIONS

M. Zhu, M. Otte, P. Chaudhari and E. Frazzoli, "Game theoretic controller synthesis for multi-robot motion planning Part I: Trajectory based algorithms," Sep. 2014, 2014 IEEE International Conference on Robotics and Automation (ICRA), 2014, pp. 1646-1651, doi: 10.1109/ICRA.2014.6907072. (Year: 2014).*

(Continued)

*Primary Examiner* — Abby Y Lin
*Assistant Examiner* — Karston G. Evans
(74) *Attorney, Agent, or Firm* — Seyfarth Shaw LLP

(57) ABSTRACT

A method for risk-aware game-theoretic trajectory planning is described. The method includes modeling an ego vehicle and at least one other vehicle as risk-aware agents in a game-theoretic driving environment. The method also includes ranking upcoming planned trajectories according to a risk-aware cost function of the ego vehicle and a risk-sensitivity of the other vehicle associated with each of the upcoming planned trajectories. The method further includes selecting a vehicle trajectory according to the ranking of the upcoming planned trajectories based on the risk-aware cost function and the risk-sensitivity of the other vehicle associated with each of the upcoming planned trajectories to reach a target destination according to a mission plan.

19 Claims, 8 Drawing Sheets

(51) Int. Cl.
*B60W 30/16* (2020.01)
*G05D 1/02* (2020.01)
*B60W 30/095* (2012.01)
*B60W 30/18* (2012.01)
*G01C 21/34* (2006.01)
*H04W 4/40* (2018.01)
*B60W 40/09* (2012.01)

(52) U.S. Cl.
CPC .. *B60W 30/18163* (2013.01); *B60W 60/0011* (2020.02); *B60W 60/0025* (2020.02); *B60W 30/0953* (2013.01); *B60W 40/09* (2013.01); *B60W 2556/65* (2020.02); *G01C 21/3453* (2013.01); *G05D 1/0214* (2013.01); *H04W 4/40* (2018.02)

(58) Field of Classification Search
CPC .. B60W 60/0011; B60W 30/16; B60W 40/09; B60W 2556/65; G01C 21/3453; H04W 4/40; G05D 1/0088; G05D 1/0214
See application file for complete search history.

(56) References Cited

U.S. PATENT DOCUMENTS

| | | | | |
|---|---|---|---|---|
| 10,089,876 | B1* | 10/2018 | Ramasamy | G08G 1/167 |
| 10,421,460 | B2 | 9/2019 | Jiang et al. | |
| 2006/0293856 | A1* | 12/2006 | Foessel | G01S 13/931 701/301 |
| 2010/0228419 | A1* | 9/2010 | Lee | B62D 15/0255 701/25 |
| 2013/0116995 | A1 | 5/2013 | Yang | |
| 2013/0141249 | A1* | 6/2013 | Pearlman | G09B 19/14 340/870.03 |
| 2016/0152182 | A1* | 6/2016 | Aoki | G08G 1/166 340/435 |
| 2017/0320500 | A1* | 11/2017 | Yoo | B60W 30/18163 |
| 2018/0107942 | A1* | 4/2018 | Jiang | G08G 1/096775 |
| 2018/0164825 | A1 | 6/2018 | Matus et al. | |
| 2018/0276485 | A1* | 9/2018 | Heck | G01C 21/3461 |
| 2018/0283895 | A1* | 10/2018 | Aikin | G01C 21/3415 |
| 2019/0241187 | A1* | 8/2019 | Maus | G06V 20/588 |
| 2019/0283763 | A1 | 9/2019 | Wang | |
| 2019/0286133 | A1* | 9/2019 | Bielby | B60W 40/10 |
| 2019/0299984 | A1 | 10/2019 | Shalev-Shwartz et al. | |
| 2019/0329783 | A1 | 10/2019 | Shalev-Shwartz | |
| 2019/0329873 | A1 | 10/2019 | Shalev-Shwartz et al. | |
| 2019/0377352 | A1* | 12/2019 | Weißwange | B60W 60/0011 |
| 2020/0039510 | A1* | 2/2020 | Kume | B60W 30/09 |
| 2020/0047750 | A1* | 2/2020 | Likhachev | B60W 60/0015 |
| 2020/0081434 | A1 | 3/2020 | Penning et al. | |
| 2020/0130703 | A1* | 4/2020 | Pendelton | A61B 5/165 |
| 2020/0135015 | A1* | 4/2020 | Kalabic | G08G 1/0133 |
| 2020/0346643 | A1* | 11/2020 | Woon | G06N 3/08 |
| 2021/0129847 | A1* | 5/2021 | Grubwinkler | G08G 1/0141 |
| 2021/0347489 | A1* | 11/2021 | Learn | B64D 13/06 |

OTHER PUBLICATIONS

L. Claussmann, M. Revilloud, D. Gruyer and S. Glaser, "A Review of Motion Planning for Highway Autonomous Driving," May 2019, in IEEE Transactions on Intelligent Transportation Systems, vol. 21, No. 5, pp. 1826-1848, May 2020, doi: 10.1109/TITS.2019.2913998. (Year: 2019).*

W. Schwarting, et al., "Stochastic Dynamic Games in Belief Space", Sep. 2019, IEEE Transactions on Robotics (Year: 2019).*

M. Bahram, et al., "A Combined Model- and Learning-Based Framework for Interaction-Aware Maneuver Prediction," Jan. 2016 in IEEE Transactions on Intelligent Transportation Systems, vol. 17, No. 6, pp. 1538-1550, Jun. 2016, doi: 10.1109/TITS.2015.2506642. (Year: 2016).*

Khonji, et al., "Risk-Aware Reasoning for Autonomous Vehicles", arXiv:1910.0246v1, Oct. 6, 2019.

Fridovich-Keil, at al., "Efficient Iterative Linear-Quadratic Approximations for Nonlinear Multi-Player General-Sum Differential Games", arXiv:1909.04694v4, Mar. 18, 2020.

Fisac, et al., "Hierarchical Game-Theoretic Planning for Autonomous Vehicles", arXiv:1810.05766v1, Oct. 13, 2018.

Xiao, et al., "Robot Motion Risk Reasoning Framework", arXiv:1909.02531v1, Sep. 5, 2019.

Sadigh, et al., "Planning for Autonomous Cars that Leverage Effects on Human Actions", Robotics: Science and Systems, Jun. 2016.

Spica, et al., "A Real-Time Game Theoretic Planner for Autonomous Two-Player Drone Racing", arXiv:1801.02302v2, Jan. 26, 2018.

Wang, et al., "Game Theoretic Planning for Self-Driving Cars in Competitive Scenarios", Robotics: Science and Systems, Jun. 22-26, 2019.

Nishimura, et al., "L2B: Learning to Balance the Safety-Efficiency Trade-off in Interactive Crowd-aware Robot Navigation", arXiv:2003.09207v1, Mar. 20, 2020.

Protopopescu, et al., "Nash Equilibrium Strategies in Discrete-Time Finite-Horizon Dynamic Games with Risk-and Effort-Averse Players," UFAE and IAE Working Papers 798.09, Unitat de Fonaments de l'Anàlisi Econòmica (UAB) and Institut d'Anàlisi Econòmica (CSIC), 2009.

* cited by examiner

GAME-THEORETIC PLANNING FOR RISK-AWARE INTERACTIVE AGENTS

STATEMENT REGARDING FEDERALLY SPONSORED RESEARCH OR DEVELOPMENT

The present disclosure was made with Government support under contract N00014-18-1-2830 awarded by the Office of Naval Research. The Government has certain rights in the present disclosure.

BACKGROUND

Field

Certain aspects of the present disclosure generally relate to autonomous vehicle technology and, more particularly, to game-theoretic planning for risk-aware interactive agents.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents are quickly evolving and are a reality in this decade. Because autonomous agents interact with humans, many critical concerns arise. For example, how to design a vehicle control plan of an autonomous vehicle using machine learning. Unfortunately, planning of vehicle control by machine learning is less effective in complicated traffic environments. These complex interactions between vehicles involve risks before a controlled (ego) vehicle merges/changes onto/into a traffic lane or encounters a critical intersection.

Techniques for risk-aware vehicle control planning to select a risk-aware vehicle control plan for an ego vehicle are desired. Conventional machine learning techniques do not consider a risk component of a current traffic state for planning vehicle control actions.

SUMMARY

A method for risk-aware game-theoretic trajectory planning is described. The method includes modeling an ego vehicle and at least one other vehicle as risk-aware agents in a game-theoretic driving environment. The method also includes ranking upcoming planned trajectories according to a risk-aware cost function of the ego vehicle and a risk-sensitivity of the other vehicle associated with each of the upcoming planned trajectories. The method further includes selecting a vehicle trajectory according to the ranking of the upcoming planned trajectories based on the risk-aware cost function and the risk-sensitivity of the other vehicle associated with each of the upcoming planned trajectories to reach a target destination according to a mission plan.

A non-transitory computer-readable medium having program code recorded thereon for risk-aware game-theoretic trajectory planning is described. The program code is executed by a processor. The non-transitory computer-readable medium includes program code to model an ego vehicle and at least one other vehicle as risk-aware agents in a game-theoretic driving environment. The non-transitory computer-readable medium also includes program code to rank upcoming planned trajectories according to a risk-aware cost function of the ego vehicle and a risk-sensitivity of the other vehicle associated with each of the upcoming planned trajectories. The non-transitory computer-readable medium further includes program code to select a vehicle trajectory according to the ranking of the upcoming planned trajectories based on the risk-aware cost function and the risk-sensitivity of the other vehicle associated with each of the upcoming planned trajectories to reach a target destination according to a mission plan.

A system for risk-aware game-theoretic trajectory planning is described. The system includes a game-theoretic risk model configured to model an ego vehicle and at least one other vehicle as risk-aware agents in a game-theoretic driving environment. The system also includes a risk-aware cost function module configured to rank upcoming planned trajectories according to a risk-aware cost function of the ego vehicle and a risk-sensitivity of the other vehicle associated with each of the upcoming planned trajectories. The system further includes a vehicle trajectory selection module configured to select a vehicle trajectory according to the ranking of the upcoming planned trajectories based on the risk-aware cost function and the risk-sensitivity of the other vehicle associated with each of the upcoming planned trajectories to reach a target destination according to a mission plan.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
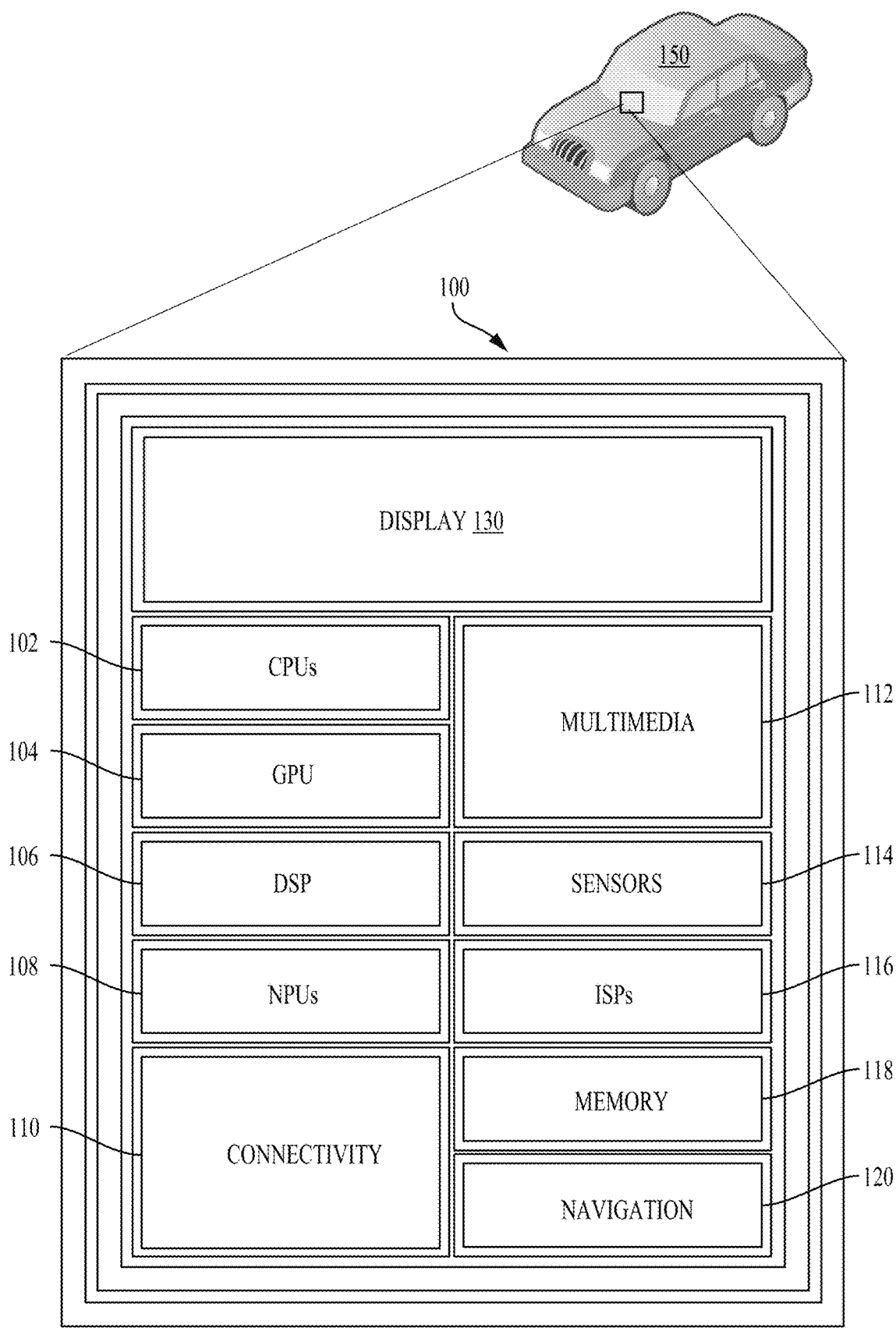
FIG. 1 illustrates an example implementation of a system and method for a risk-aware vehicle trajectory planning system using a system-on-a-chip (SOC) of an autonomous vehicle, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways and roadways affects millions of people and presents an urgent problem to solve. In particular, vehicles may perform lane changes prior to roadway intersections, which may generate traffic oscillations and extra congestion. For example, irregular lane changes proximate a critical intersection are a significant source of traffic congestion. As a result, roadway traffic is potentially congested due to irregular lane change behavior and unexpected braking maneuvers of surrounding vehicles. Automated vehicles are expected to reduce traffic accidents and improve traffic efficiency. In particular, automation of vehicle control on roadways and highways is rapidly advancing, which may eventually reduce traffic accidents and improve traffic efficiency.

Reducing collisions may be achieved by risk-aware interactive trajectory planning of controlled vehicles. For example, the trajectory of vehicles may be planned when changing lanes before a critical intersection in a manner that does not detrimentally affect traffic on the roadway. According to one aspect of the present disclosure, a vehicle trajectory planning system is described to effectively plan a trajectory of a controlled vehicle, while reducing the traffic impact on the roadway by considering risk associated with the planned trajectory.

Vehicle trajectory planning by machine learning is less effective in complicated traffic environments. For example, these traffic environments may involve complex interactions between vehicles, including situations where a controlled (ego) vehicle merges into a target lane before a critical intersection. Conventional machine learning techniques for vehicle trajectory may use a network to select an appropriate vehicle trajectory plan from input data relative to the ego vehicle. For example, a risk-aware planned trajectory of the controlled (ego) vehicle may be determined to enter a merge gap. As described herein, a "merge gap" is a gap located between two vehicles in a target lane into which an ego vehicle may desire to merge. As also described herein, a "critical intersection" refers to an intersection in which the ego vehicle desires to perform some action, such as turning (e.g., left turn, right turn, or U-turn) the ego vehicle at the intersection.

Unfortunately, conventional trajectory planning techniques are not risk-aware of a current traffic state when planning a vehicle trajectory. For example, conventional trajectory planning techniques do not consider risk associated with a planned trajectory to enter a merge gap. Rather, conventional trajectory planning techniques view a "merge gap" as an open space without a risk-aware game-theoretic planning component. Aspects of the present disclosure provide an improvement over conventional trajectory planning techniques by using game-theoretic planning of risk-aware autonomous agents for performing trajectory planning. This aspect of the present disclosure seeks to reduce a risk associated with possible planned trajectories.

Aspects of the present disclosure describe the interaction of risk-aware agents in a game-theoretical framework. In particular, the present disclosure demonstrates that the game-theoretic framework leads to more time efficient behaviors and higher safety when facing underlying risks in an uncertain environment. One configuration of a disclosed trajectory planning system models each agent as a risk-aware agent with entropic risk measure. This model involves an iterative algorithm for approximating the feedback Nash equilibria of a risk-sensitive dynamic game. For example, at each iteration, the trajectory planning system derives a linearized approximation of the system dynamics and a quadratic approximation of the cost function in solving a backward recursion for finding feedback Nash equilibria. The trajectory planning system results in behaviors for the agents that are more realistic and intuitive. Further, a trajectory planning system is also more time efficient and safer than if either the game interaction or the risk sensitivity were ignored.

FIG. 1 illustrates an example implementation of the aforementioned system and method for a risk-aware vehicle trajectory planning system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, assess a navigation cost of a tactical driving decision to improve a vehicle trajectory planning system to select a vehicle trajectory plan, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code to plan upcoming tactical driving decisions of the ego vehicle to reach the target destination according to a mission plan. The instructions loaded into a processor (e.g., CPU 102) may also include code model an ego vehicle and at least one other vehicle as risk-aware agents in a game-theoretic driving environment. The instructions loaded into a processor (e.g., CPU 102) may also include code to rank upcoming planned trajectories according to a risk-aware cost function of the ego vehicle and a risk-sensitivity of the other vehicle associated with each of the upcoming planned trajectories. The instructions loaded into a processor (e.g., CPU 102) may further include code to select a vehicle trajectory according to the ranking of the upcoming planned trajectories based on the risk-aware cost function and the risk-sensitivity of the other vehicle associated with each of the upcoming planned trajectories to reach a target destination according to a mission plan.

Figure 2:
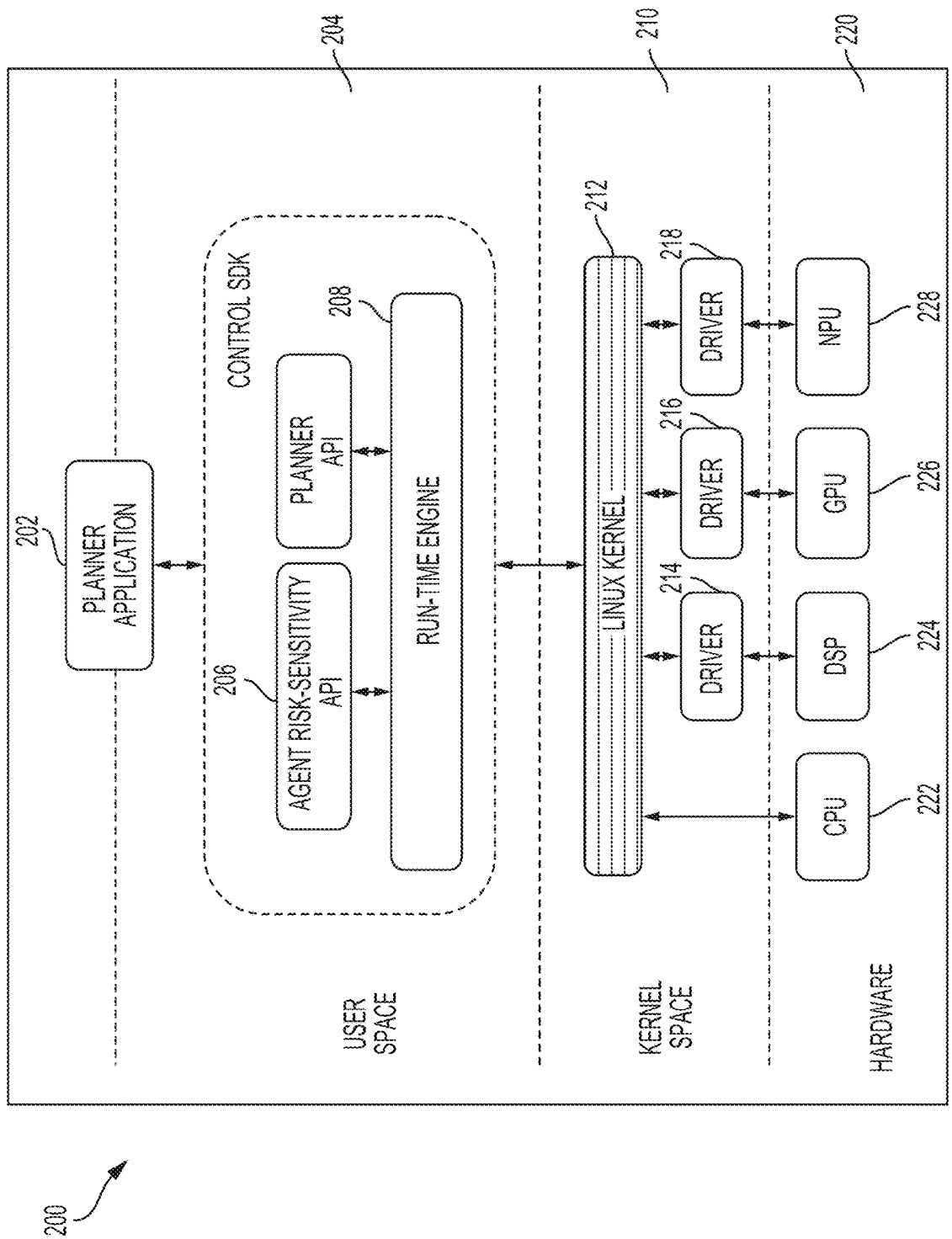
FIG. 2 is a block diagram illustrating a software architecture that may modularize artificial intelligence (AI) functions for a risk-aware vehicle trajectory planning system of an autonomous agent, according to aspects of the present disclosure.

FIG. 2 is a block diagram illustrating a software architecture 200 that may modularize artificial intelligence (AI) functions for planning a vehicle trajectory of an autonomous agent by modeling as risk-aware agents in a game-theoretical framework, according to aspects of the present disclosure. Using the architecture, a planner application 202 may be designed such that it may cause various processing blocks of an SOC 220 (for example a CPU 222, a DSP 224, a GPU 226, and/or an NPU 228) to perform supporting computations during run-time operation of the planner application 202. While FIG. 2 describes the software architecture 200 for planning a trajectory of an autonomous agent, it should be recognized that vehicle trajectory planning functionality is not limited to autonomous agents. According to aspects of the present disclosure, the risk-aware vehicle trajectory planning functionality is applicable to any vehicle type, provided the vehicle is equipped with appropriate functions (e.g., vehicle-to-vehicle (V2V) communication) of connected vehicle applications and/or an advanced driver assistance system (ADAS).

The planner application 202 may be configured to call functions defined in a user space 204 that may, for example, provide for vehicle trajectory planning services. The planner application 202 may make a request to compile program code associated with a library defined in an agent risk-sensitivity application programming interface (API) 206 to plan a vehicle trajectory. Planning of the vehicle trajectory may ultimately rely on the output of a convolutional neural network configured to plan a trajectory of an autonomous agent using a risk-aware cost function based on a current goal destination of the autonomous agent.

A run-time engine 208, which may be compiled code of a runtime framework, may be further accessible to the planner application 202. The planner application 202 may cause the run-time engine 208, for example, to take actions for planning the controlling of an autonomous agent. When an ego vehicle plans a trajectory to merge onto a traffic lane, the run-time engine 208 may in turn send a signal to an operating system 210, such as a Linux Kernel 212, running on the SOC 220. FIG. 2 illustrates the Linux Kernel 212 as software architecture for implementing trajectory planning of an autonomous agent using agent risk-sensitivity information. It should be recognized, however, that aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
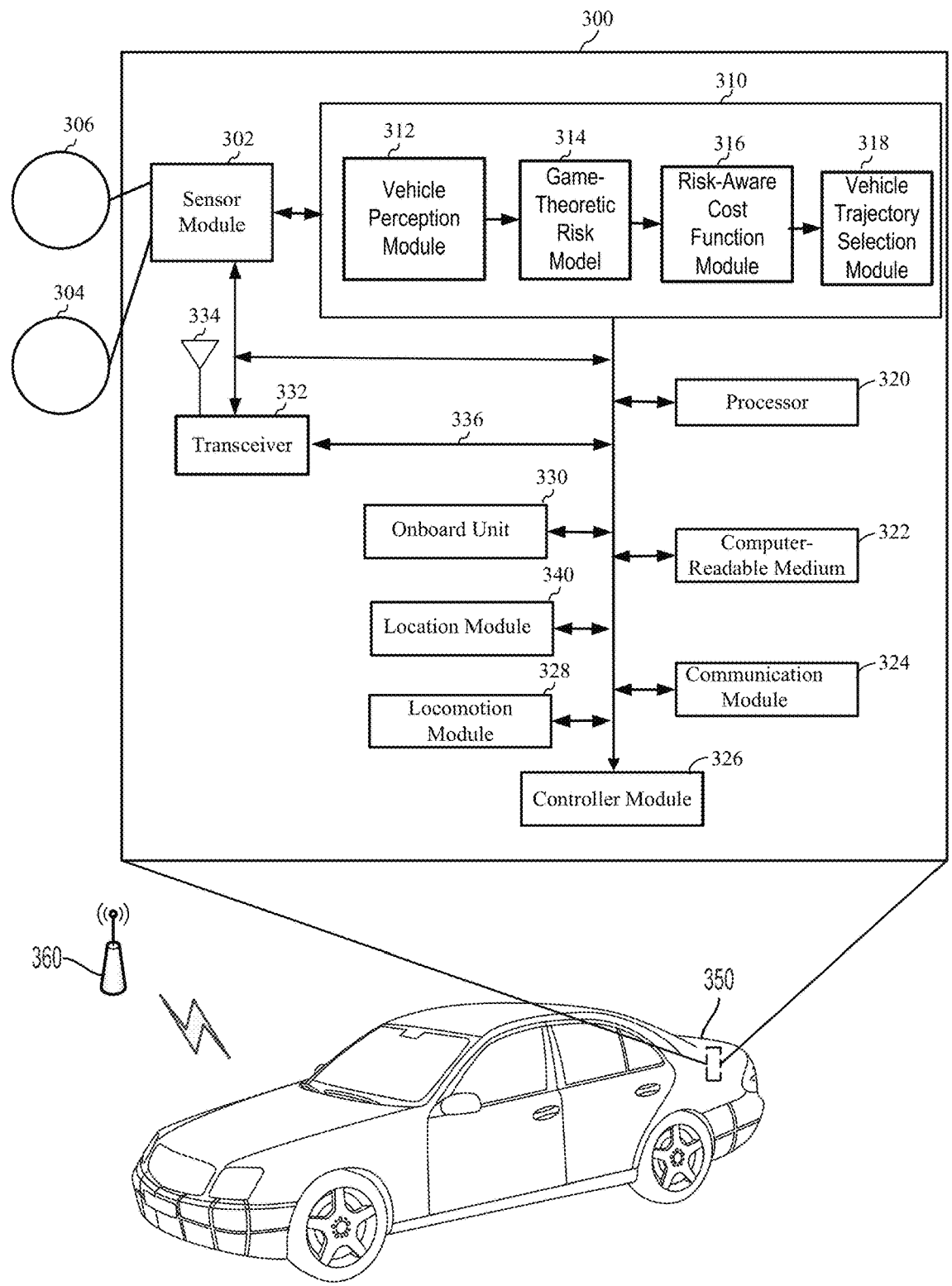
FIG. 3 is a diagram illustrating an example of a hardware implementation for a risk-aware vehicle behavior control planning system, according to aspects of the present disclosure.

FIG. 3 is a diagram illustrating an example of a hardware implementation for a vehicle trajectory planning system 300, according to aspects of the present disclosure. The vehicle trajectory planning system 300 may be configured for improved planning of tactical driving decisions using a risk-aware cost function. For example, a risk-aware cost function is used to improve the trajectory planning efficiency of an ego vehicle prior to a critical intersection at which to perform a tactical driving maneuver (e.g., a right/left turn). The vehicle trajectory planning system 300 may be a component of a vehicle, a robotic device, or other non-autonomous device (e.g., non-autonomous vehicles, ride-share cars, etc.). For example, as shown in FIG. 3, the vehicle trajectory planning system 300 is a component of a car 350.

Aspects of the present disclosure are not limited to the vehicle trajectory planning system 300 being a component of the car 350. Other devices, such as a bus, motorcycle, or other like non-autonomous vehicle, are also contemplated for implementing the vehicle trajectory planning system 300. In this example, the car 350 may be autonomous or semi-autonomous; however, other configurations for the car 350 are contemplated, such as an advanced driver assistance system (ADAS).

The vehicle trajectory planning system 300 may be implemented with an interconnected architecture, represented generally by an interconnect 336. The interconnect 336 may include any number of point-to-point interconnects, buses, and/or bridges depending on the specific application of the vehicle trajectory planning system 300 and the overall design constraints. The interconnect 336 links together various circuits, including one or more processors and/or hardware modules, represented by a sensor module 302, a vehicle trajectory planner 310, a processor 320, a computer-readable medium 322, a communication module 324, a controller module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle trajectory planning system 300 includes a transceiver 332 coupled to the sensor module 302, the vehicle trajectory planner 310, the processor 320, the computer-readable medium 322, the communication module 324, the controller module 326, the locomotion module 328, the location module 340, and the onboard unit 330. The transceiver 332 is also coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle risk-sensitivity state information for the vehicle trajectory planner 310 to/from connected vehicles within the vicinity of the car 350.

The vehicle trajectory planning system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the vehicle trajectory planning system 300 to perform the various functions described for vehicle trajectory (e.g., a planned trajectory for a vehicle merging prior to a critical intersection) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle trajectory planner 310, the communication module 324, the controller module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, Wi-Fi, long term evolution (LTE), 4G, 3G, etc. The communication module 324 may also communicate with other components of the car 350 that are not modules of the vehicle trajectory planning system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle trajectory planning system 300 also includes the controller module 326 controlling the locomotion of the car 350, via the locomotion module 328 for autonomous operation of the car 350 to enable travel to a goal destination. In one configuration, the controller module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), drivers can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle trajectory planner 310 may be in communication with the sensor module 302, the processor 320, the computer-readable medium 322, the communication module 324, the controller module 326, the locomotion module 328, the location module 340, the onboard unit 330, and the transceiver 332. In one configuration, the vehicle trajectory planner 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle trajectory planner 310 may receive sensor data directly from the first sensor 306 and the second sensor 304 to determine, for example, input traffic data images.

As shown in FIG. 3, the vehicle trajectory planner 310 includes a vehicle perception module 312, a game-theoretic risk model 314, a risk-aware cost function module 316, and a vehicle trajectory selection module 318. The vehicle perception module 312 may be a components of an artificial neural network, such as a deep convolutional neural network (CNN). The vehicle perception module 312 is not limited to a CNN. The vehicle perception module 312 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The vehicle trajectory planner 310 may rely on the onboard unit 330, which is configured to communicate with other connected vehicles within proximity of the car 350. This communication may acquire traffic state information, as well as a risk sensitivity of other connected vehicles used by the risk-aware cost function module 316 to compute a risk-aware cost function associated with a planned trajectory to complete a potential tactical driving decision. In operation, the risk-aware cost function module 316 generates a risk-sensitive cost and associated planned trajectories of both the ego vehicle and another vehicle. For example, a merging behavior of the car 350 may be controlled by the vehicle trajectory planner 310 in a manner that seeks to minimize a risk-aware cost function associated with planning a trajectory, while considering a risk-sensitivity of other traffic participants. The risk-ware cost function associated with planning a trajectory for merging into a target lane is minimized for the ego vehicle to make a more fluid entry into a merge gap between vehicles in a target lane by considering the risk-sensitivity of other traffic participants, for example, as shown in FIG. 4.

Figure 4:
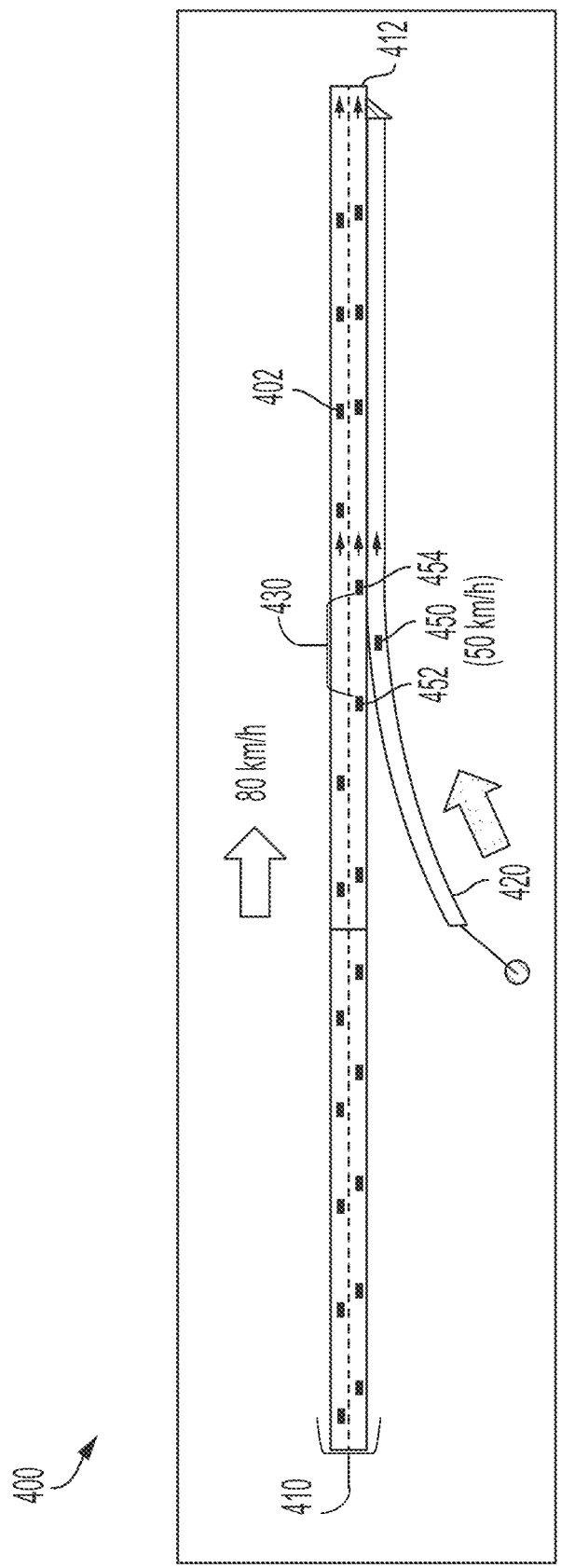
FIG. 4 is a diagram illustrating an overview of a highway environment, including vehicles on a highway main-lane and an ego vehicle on a highway on-ramp, according to aspects of the present disclosure.

FIG. 4 is a diagram illustrating an overview of a highway environment, including vehicles on a highway main-lane and an ego vehicle on a highway on-ramp, according to aspects of the present disclosure. The highway environment 400 includes a highway main-lane 410 having vehicles 402, and a highway on-ramp 420 having an ego vehicle 450. In this configuration, the ego vehicle 450 is configured to monitor the dynamics of both vehicles on the highway main-lane 410, as well as vehicles on the highway on-ramp 420, including a risk-sensitivity of other connected vehicles. In this example, the ego vehicle 450, may be the car 350, shown in FIG. 3.

In one aspect of the present disclosure, trajectory planning of the ego vehicle 450 is essentially performed by a vehicle planner (e.g., the vehicle trajectory planner 310 of FIG. 3). In this example, the ego vehicle 450 (e.g., the vehicle perception module 312 of FIG. 3) identifies a merge gap 430 between a first vehicle 452 and a second vehicle 454 on a first highway main-lane 412 (e.g., a target lane). That is, the ego vehicle 450 is configured to identify the merge gap 430 and plan a trajectory (e.g., vehicle trajectory selection module 318) to enable entry onto the first highway main-lane 412 from the highway on-ramp 420. In this example, the highway on-ramp is a drop-lane that ends, which may be identified as a critical intersection, as further described below. According to aspects of the present disclosure, the ego vehicle 450 is configured to consider risk-sensitivity of the ego vehicle 450 as well as the first vehicle 452 and the second vehicle 454. In one configuration, the vehicle trajectory selection module 318 of FIG. 3 selects a vehicle trajectory that is risk-aware to enable the ego vehicle 450 to safely and successfully merge into the merge gap 430.

In aspects of the present disclosure, the ego vehicle 450 is configured to perform vehicle trajectory planning for minimizing a risk-aware cost function associated with merging into the merge gap 430. Minimizing the risk-aware cost function increases the probability of a successful merge onto the highway main-lane 410 (e.g., a target lane). In operation, the vehicle planner (e.g., vehicle trajectory selection module 318 of FIG. 3) selects a trajectory of the ego vehicle 450 to efficiently and smoothly merge into traffic on the highway main-lane 410 from the highway on-ramp 420. In this example, if a target speed of the ego vehicle 450 is not safe, the vehicle planner ignores the target speed and selects a different merge gap. Therefore, a collision avoidance function is provided by the vehicle planner (e.g., vehicle trajectory planner 310).

In this example, the ego vehicle 450 enters the highway on-ramp 420 at fifty (50) kilometers (km) per hour (km/h), while the flow of traffic of the vehicles 402 is approximately eighty (80) km/h. Subsequently, the trajectory of the ego vehicle 450 is selected to minimize the risk-aware cost function associated with a planned trajectory to complete the tactical driving maneuver of transitioning into the merge gap 430. The vehicle planner controls the trajectory of the ego vehicle 450 until the ego vehicle 450 successfully merges onto the highway main-lane 410. In this example, the first vehicle 452 and the second vehicle 454 may be connected vehicles configured to communicate with the ego vehicle 450 to enable exchange of risk-sensitivity to enter into the merge gap 430 and onto the highway main-lane 410. The risk-aware cost function associated with selecting a trajectory for entering a merge gap is further complicated when the merge action is performed before a critical intersection at which a vehicle action is performed, for example, as shown in FIG. 5.

Figure 5:
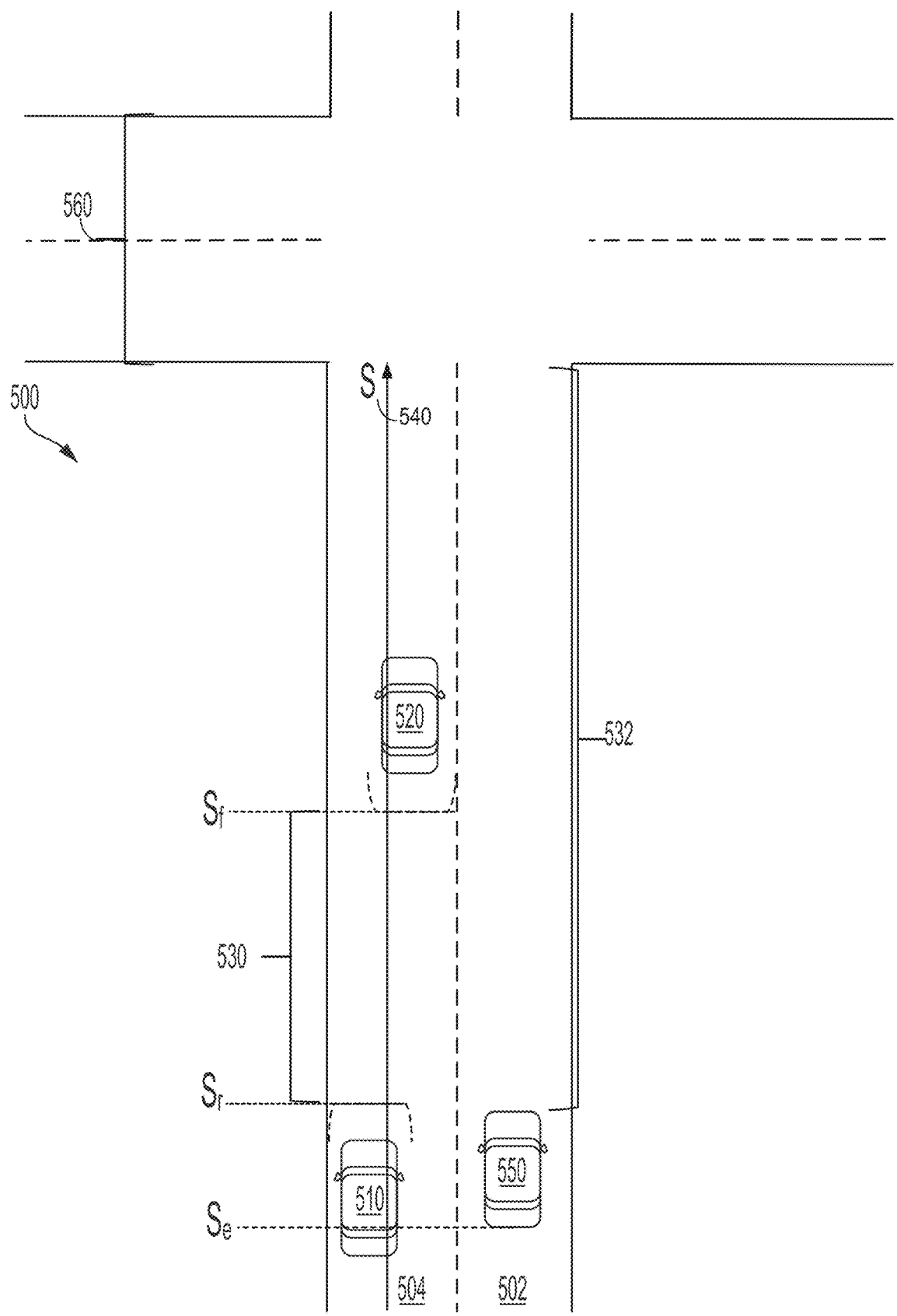
FIG. 5 is a diagram illustrating an overview of a traffic environment, including vehicles on highway lanes and an ego vehicle prior to a lane change before a critical intersection, according to aspects of the present disclosure.

FIG. 5 is a diagram illustrating an overview of a traffic environment, including vehicles on roadway lanes and an ego vehicle prior to a lane change, according to aspects of the present disclosure. The traffic environment includes a multilane roadway 500 (e.g., a two lane roadway), having a first lane 502 and a target lane 504 (e.g., a second lane), in which the first lane 502 includes an ego vehicle 550. In this configuration, the ego vehicle 550 is configured to monitor the dynamics of vehicles on the multilane roadway 500, such as a first vehicle 510 and a second vehicle 520 in the target lane 504 of the multilane roadway 500. In this example, the ego vehicle 550 desires a planned trajectory to perform a tactical driving maneuver of changing lanes from the first lane 502 to the target lane 504 of the multilane roadway 500. In this example, the ego vehicle 550 may be the car 350, shown in FIG. 3.

Aspects of the present disclosure are directed to a vehicle trajectory planning system that assesses a risk-aware cost for planning a trajectory to perform a tactical driving decision for determining whether to perform a tactical driving maneuver. As described herein, a "tactical driving decision" (of whether to provide a tactical driving maneuver) refers to a high level decision during operation of an ego vehicle. In a simplest form, the high level decision of whether to maintain the ego vehicle in the current lane or change lanes to a target lane (e.g., a left/right merge operation) is a tactical driving decision. As described herein, a "risk-aware cost" may refer to a number that informs the autonomous driving agent (e.g., vehicle trajectory planning system) of "risk-sensitivity" associated with a tactical driving maneuver to achieve the autonomous driving agent's goal (e.g., reaching a target destination).

In one aspect of the present disclosure, a trajectory of the ego vehicle 550 is planned by a vehicle planner (e.g., the vehicle trajectory planner 310 of FIG. 3) using a risk-aware game-theoretic model (e.g., the game-theoretic risk model of FIG. 3). In this example, the ego vehicle 550 (e.g., the vehicle perception module 312 of FIG. 3) identifies a merge gap 530 between the first vehicle 510 and the second vehicle 520 in the target lane 504. That is, the ego vehicle 550 is configured to identify the merge gap 530 and plan a trajectory to enable a lane change (e.g., a tactical driving maneuver) of the ego vehicle 550 from the first lane 502 to the target lane 504. The ego vehicle 550 is configured to compute a risk-aware cost function for planning a trajectory for performing the tactical driving maneuver of merging into the merge gap 530 prior to a critical intersection 560. In this example, the ego vehicle 550 is merging into the target lane 504 to enable a left hand turn at the critical intersection 560 for enabling the ego vehicle 550 to reach a target destination.

As further illustrated in FIG. 5, an S-axis 540 indicates a position along the target lane 504 of the multilane roadway 500. In this example, the ego vehicle 550 is shown at a position $S_e$. The position $S_e$ can change with time "t", so it becomes a function $S_e(t)$. The same holds for the first vehicle 510 and the second vehicle 520 that define the merge gap 530. The first vehicle 510 (e.g., rear obstacle) has position $S_r(t)$ and the second vehicle 520 (e.g., front obstacle) has position $S_f(t)$. The positions $S_r$ and $S_f$ can be chosen to incorporate a predetermined amount of padding distance for planning a trajectory to account for a safe driving distance and the length of the ego vehicle 550. Another parameter is computing the risk-aware cost associated with planning a trajectory to complete the tactical driving maneuver of merging into the target lane is a distance 532 to the critical intersection 560.

According to one aspect of the present disclosure, the vehicle trajectory planning system is configured to compute a risk-aware cost function associated with planning a trajectory to complete a tactical driving maneuver (e.g., a merge into the target lane 504 before the critical intersection 560). This aspect of the present disclosure is directed to the interaction of risk-aware agents in a game-theoretical framework for planning an ego vehicle trajectory. Using a game-theoretic framework leads to more time efficient behaviors and higher safety when facing underlying risks in an uncertain environment. This aspect of the present disclosure models each agent as a risk-aware agent using an entropic risk measure, while studying the feedback Nash equilibria of a dynamic game between the risk-aware agents.

In one aspect of the present disclosure, an iterative algorithm for approximating the feedback Nash equilibria of a risk-sensitive dynamic game is described due to the intractability of computing the exact Nash equilibria of such games. At each iteration of the iterative algorithm, a linearized approximation of the system dynamics and a quadratic approximation of the cost function is used in solving a backward recursion for finding feedback Nash equilibria. In one configuration, a risk-sensitive interactive planning framework enables planning of behaviors that are more realistic and intuitive. Further, this framework is more time efficient and safer relative to a game interaction in which risk sensitivity is ignored.

Uncertainties are intrinsic to robots because robots may be subject to disturbances, modeling ambiguity, and uncertain localization. Conventional trajectory planning methods are not sufficient when accounting for risks that are associated with an uncertain environment. A risk-sensitivity based planning method may provide a practical and safe tool for capturing uncertainty. In reality, humans are not risk-neutral, but rather, are risk-aware in their decision making, which reinforces the applicability and relevancy of risk measures. For example, risk measures used in risk-sensitive planning are entropic risk and conditional value at risk (CVaR). Entropic risk may provide optimal control due to its simplicity and tractability, while CVaR may be incorporated in trajectory optimization due to its interpretability. In risk-aware trajectory optimization, an agent has an inherent risk tolerance, which determines how conservatively the agent acts (e.g., how sensitive the agent is to the underlying risks). For instance, the more risk-sensitive an agent, the further the average minimum distance between the agent and an obstacle.

Going beyond obstacle avoidance, in interactive scenarios, such as autonomous driving, robots interact with other intelligent agents such as human drivers or other robotic cars. Such settings are fundamentally game-theoretic. That is, in the absence of uncertainty, treating the interaction as a game, robots can reason about the impact of their actions as well as the intentions of other agents. In particular, when dealing with uncertainties, assuming that all agents capture a notion of risk in their planning, aspects of the present disclosure generate a more realistic and time efficient behavior for autonomous agents by modelling the interaction of risk-sensitive agents. For example, during interactions, the extent to which agents exhibit risky maneuvers is not solely determined by their inherent risk tolerance, it depends on a degree of risk-sensitivity of the other agents.

Aspects of the present disclosure model the interaction of risk-aware agents in a game-theoretical framework. Other aspects of the present disclosure recognize that by being aware of the underlying risk during interactions, a risk-aware trajectory planning method leads to safer behaviors, which is represented by higher distance from other agents. Moreover, aspects of the present disclosure are not overly conservative either. By anticipating the feedback of game-theoretic interactions, the risk-aware trajectory planning method can leverage other agent's risk-awareness and plan a time efficient trajectory.

One aspect of the present disclosure models the interaction of risk-aware agents via the equilibrium of a risk-sensitive dynamic game between agents, where every agent minimizes an entropic risk measure of their underlying cost function. In particular, the feedback Nash equilibrium of the risk-sensitive dynamic game between such risk-aware agents is analyzed. Unfortunately, finding the exact Nash equilibria of the dynamic game, which is an instance of a general-sum dynamic game with nonlinear cost functions is, in general, intractable. Another aspect of the present disclosure derives an iterative algorithm for approximating the feedback Nash equilibria of the risk-sensitive dynamic game. For example, each iteration relies on a linearized approximation of the system dynamics and a quadratic approximation of the cost function in solving a backward recursion for finding feedback Nash equilibria, as described in further detail below.

Problem Statement

According to aspects of the present disclosure, when facing uncertainties, optimizing the expected cost is often not intuitive and may incur high risk. In aspects of the present disclosure, two agents that are both risk-sensitive are considered. Note that for simplicity, the focus is on the two-player setting; however, the problem formulation and the proposed solution can be extended to more than two players. The system dynamics follow the definition in the following equation:

$$x_{t+1} = f_t(x_t, u_t^1, u_t^2, w_t), \qquad (1)$$

where $x_t$ is the state of the system at time step t, $u_t^1$, and $u_t^2$ are the control inputs of player 1 and 2 at time t, respectively. Moreover, $w_t \sim \mathcal{N}(0, W_t)$ is the system noise which is assumed to be normally distributed with covariance matrix $W_t$. In addition, the agent i is assumed to have a finite-horizon cost function of the form:

$$\psi^i = \Sigma_{t=0}^{T}(g_{x,t}^i(x_t) + g_{u,t}^i(u_t^1, u_t^2)), \qquad (2)$$

where $g_{x,t}^i$ is state cost and $g_{u,t}^i$ is control cost. A risk-neutral agent i's objective is to minimize the expected cost:

$$J^i = \mathbb{E}[\psi^i]. \qquad (3)$$

In addition, the cost function is given as in Equation (2). Assuming that every agent is risk-sensitive, the corresponding risk-sensitive cost function of agent i with risk-sensitivity parameter $\theta^i$ is defined as:

$$J^i(x_0; \theta^i) = R_{\theta^i}(\psi^i) = \frac{1}{\theta^i} \log \mathbb{E}[e^{(\theta^i \psi^i)}]. \qquad (4)$$

With the risk sensitivity utility, the strategy space, and Nash equilibria strategies are defined accordingly. In the context of risk-sensitive games, for linear exponential quadratic games, the feedback of Nash equilibria solution is provided. This aspect of the present disclosure leverages the use of an iterative approach to extend the solution of non-linear system dynamics and cost functions for a risk-sensitive dynamic game. This proposed approach iteratively approximates the original nonlinear problem with linear dynamics and quadratic costs, and aims to approximate a Nash equilibrium in the sense of the approximated system.

Iterative Linear Exponential Quadratic (LEQ) Game

In this section, a solution is described to an extended set of LEQ games with linear dynamics and cross-quadratic cost functions. In addition, a proposed iterative LEQ game solution for general risk-sensitive games is described according to aspects of the present disclosure.

A. LEQ Game

The solution of risk sensitive discrete-time dynamic games exists for systems with linear dynamics and quadratic costs. First, one configuration extends this result to consider a more general case with cross quadratic cost functions. For linear dynamics, the system dynamics are:

$$x_{t+1}=A_t x_t+B_t^1 u_t^1+B_t^2 B_t^2+w_t, \quad (5)$$

where $A_t$, $B_t^1$, and $B_t^2$ are matrices of appropriate dimensions. The cost function for agent i includes additional terms that are linear in state and control as:

$$\psi^i = \sum_{t=0}^{T-1} \left[ \frac{1}{2} x_t^T Q_t^i x_t + l_t^{iT} x_t + \frac{1}{2} \sum_j u_t^{jT} R_t^{ij} u_t^j \right] + \frac{1}{2} x_T^T Q_T^i x_T + l_T^{iT} x_T, \quad (6)$$

where $Q_t^i \geq 0$, $R_t^{ij} > 0$ and $l_t^i$ are matrices of approximate dimensions. It is assumed that each agent optimizes the risk-sensitive cost of Equation (4) with $\psi^i$ being defined according to Equation (6).

Lemma 1.1: For a two-agent risk-sensitive game, let $\theta^1$ and $\theta^2$ be the risk-sensitivity parameters for the two agents, respectively. For every agent i=1, 2, let $P_t^i$ and $\alpha_t^i$ be matrices of appropriate dimensions that satisfy the following sets of linear matrix equations:

$$\left[ R_t^{ii} + B_t^{iT} \tilde{Z}_{t+1}^j B_t^i \right] P_T^1 + B_t^{iT} \tilde{Z}_{t+1}^j \sum_{j \neq i} B_t^j P_t^j = B_t^{iT} \tilde{Z}_{t+1}^j A_t, \quad (7a)$$

$$\left[ R_t^{ii} + B_t^{iT} \tilde{Z}_{t+1}^j B_t^i \right] P_T^1 + B_t^{iT} \tilde{Z}_{t+1}^j \sum_{j \neq i} B_t^j P_t^j = \quad (7b)$$

$$B_t^{iT} W_t^{-1}(W_t^{-1} - \theta^i Z_{t+1}^i)^{-1} \zeta_{t+1}^i,$$

where $\tilde{Z}_t^i$, $Z_t^i$, and $\zeta_t^i$ are recursively obtained from the following equations $$\tilde{Z}_{t+1}^i = Z_{t+1}^i + \theta^i Z_{t+1}^i (W_t^{-1} - \theta^1 Z_{t+1}^i)^{-1} Z_{t+1}^i, \quad (8)$$

$$Z_t^i = Q_t^i + \sum_j P_t^{jT} R_t^{1j} P_t^j + F_t^T \tilde{Z}_{t+1}^j F_t, \quad (9)$$

$$\zeta_t^{iT} = l_t^{iT} + \sum_j \alpha_t^{jT} R_t^{ij} P_t^j + \beta_t^T \tilde{Z}_{t+1}^j F_t + \zeta_{t+1}^{iT}(W_t^{-1} - \theta^i Z_{t+1}^i)^{-1} W_t^{-1} F_t, \quad (10)$$

where $$F_t = A_t - \sum_{j=1,2} B_t^j P_t^j, \beta_t = - \sum_{j=1,2} B_t^j \alpha_t^j. \quad (11)$$

The terminal conditions for Equations (9) and (10) are:

$$Z_T^i = Q_T^i, \zeta_T^i = l_T^i. \quad (12)$$

Note it is specified that $$W^{-1} - \theta^i Z_t^i \succ 0, \forall t \in T, i=1,2 \quad (13)$$

to avoid "neurotic breakdown." If this condition is not satisfied, the risk-sensitive cost of Equation (4) becomes infinity. The following Corollary provides a Nash equilibria solution to the risk-sensitive game.

Corollary 1.1: A two-person linear exponential quadratic game defined by system dynamics of Equation (5), the cost function of Equation (6), and risk sensitive cost function of Equation (4) admits a unique feedback Nash equilibrium solution if, and only if, Equation (7) admits unique solution sets: $\{P_t^{i*}, \alpha_t^{i*}, t \in T, i=1, 2\}$. Furthermore, the equilibrium strategies are given by:

$$\gamma_t^{i*}(x_t) = -P_t^{i*} x_t - \alpha_t^{i*}. \quad (14)$$

Note that with the risk-sensitivity parameters $\theta^1=\theta^2=0$, the Gaussian covariance matrix $W_t$ no longer appears in Lemma 1.1. Hence risk-neutral control policy is indifferent to the level of noise.

B. Iterative LEQ Problem

To handle general nonlinear dynamics and cost functions, aspects of the present disclosure propose an iterative process that proceeds as follows. The process begins with a nominal strategy sequence $\{P_t^i, \alpha_t^i\}$ for each time step $t \in T$, and each agent i=1, 2. If a nominal policy is not available, a trivial initialization is performed by initializing all matrices to zeros. Then, at each iteration, a nominal state trajectory and nominal action trajectories, $\eta=\{\bar{x}, \bar{u}^1, \bar{u}^2\}$ are obtained from forward simulation of the system dynamics using the nominal strategy, in which $\eta$ denotes a set of nominal trajectories, including state trajectory $\bar{x}$, and action trajectories for both players $\bar{u}^1, \bar{u}^2$. Let $\delta x_t = x_t - \bar{x}_t$, $\delta u_t^i = u_t^i - \bar{u}_t^i$, then acquire a linear approximation of the dynamics of Equation (1) as:

$$\delta x_{t+1} \approx A_t \delta x_t + \sum_{i=1,2} B_t^i \delta u_t^i, \quad (15)$$

where $A_t = D_x f_t(\cdot)$ and $B_t^i = D_{u_i} f_t(\cdot)$ are Jacobians of the original nonlinear dynamics function with respect to $x_t$ and $u_t^i$, respectively. Furthermore, the cost function of Equation (2) is approximated using quadratic functions:

$$g_{x,t}^i(\bar{x}_t + \delta x_t) \approx g_{x,t}^i(\bar{x}_t) + \frac{1}{2} \delta x_t^T Q_t^i \delta x_t + l_t^{iT} \delta x_t, \quad (16)$$

where $Q_t^i = D_{x_t x_t} g_{x,t}^i(\cdot)$ and $l_t^i = D_{x_t} g_{x,t}^i(\cdot)$ are the Hessian and the gradient of the cost function $g_{x,t}^i(\cdot)$ with respect to $x_t$. Note that this formulation considers nonlinear costs on state variables, and $g_{u,t}^i(\cdot)$ is quadratic. For a more general case, where the cost function is also nonlinear on control inputs, a similar approximation could be used to derive the quadratic terms and linear terms in $u_t^i$.

All the approximations $A_t$, $B_t^i$, $Q_t^i$, $l_t^i$ are evaluated at $\eta$. For the linearized system dynamics and quadratized cost function, a new LEQ game problem is obtained with new variable sequences $\delta x$, $\delta u^1$, and $\delta u^2$. These approximations result in a new game that can be solved using Lemma 1.1. Once the approximated game is solved, a new sequence of control inputs is obtained as follows:

$$\{\bar{u}_t^i + \delta u_t^{i*}, t=0, \ldots, T-1\} \quad (17)$$

where $u_t^*$ is the solution for previous iteration. A new $\bar{x}_t$ is attained from the forward simulation of the original system dynamics of Equation (2) using the newly obtained control inputs. This process is repeated until convergence (e.g., the deviation of the new state trajectory from the state trajectory in the previous iteration lies within tolerance). In practice, the maximum number of iterations is limited for real-time implementations of the proposed process. An outline of the proposed process is summarized in Table I.

TABLE 1

Iterative Linear Exponential Quadratic Game

1: Inputs
2:     system dynamics of Equation (1), risk sensitivity utility of Equation (4)
3:     risk sensitive parameters $\theta^1, \theta^2$
4: Initialization
5:     initialize the control policy using $P_t^i = \alpha_t^i = 0, \forall i$
6:     forward simulation and obtain $(\bar{x}_0, \bar{x}_1, \bar{x}_2, \ldots, \bar{x}_T), (\bar{u}_0^1, \ldots, \bar{u}_{T-1}^1)$, and $(\bar{u}_0^2, \ldots, \bar{u}_{T-1}^2)$
7: while not converged do
8:     linear approximation of Equation (1)
9:     quadratic approximation of Equation (4)
10:     solve the backward recursion with Equations (7)-(12)
11:     forward simulation and obtain the new trajectories
12: end while
13: return policy $P_t^i, \alpha_t^i$ Applying $\bar{u}_t^i$ directly from Equation (17) may lead to non-convergence because the resulting trajectory could deviate from the original non-linear systems which we approximated around $\eta_t$. As in other iterative optimal control problems, the proposed processes is augmented with a line search. At each iteration, rather than using Equation (17), the following control input is applied:

$$\bar{u}_t^i - P_t^i \delta x_t - \in \alpha_t^i, \quad (18)$$

where $\in$ is the step size for improving our control strategy. Initially, $\in = 1$ is set. If the new trajectory deviates too far from the nominal trajectory, the trajectory is rejected and $\in$ is decreased by half.

As mentioned in Lemma 1.1, there is an important value $\theta^{crit}$ in the case of a positive risk-sensitivity parameter. The intuition is that, if a player is too risk-averse, then, due to the rapid growth of the exponential function, the agent's risk-sensitive cost according to Equation (4) under uncertainty may approach infinity with any possible choice of policy. Aspects of the present disclosure implement backtracking on positive risk-sensitivity parameters. For example, an initial risk-sensitivity parameter is used in the backward computation. At every stage, Equation (13) is asserted. If the criteria is violated, then $\theta$ is decreased by half.

Case Studies

In this section, the performance of our proposed iterative process for solving risk-sensitive dynamic games in different systems and simulation environments is described. Initially, the proposed process generates intuitive, interpretable and safe trajectories. Then, to highlight the importance of capturing the interactions via games, the proposed framework is compared with a baseline where the interaction of risk-sensitive agents is disregarded, and each risk-aware agent treats the other agent as a nonreactive obstacle. Moreover, the performance of the proposed process is compared with interaction between risk-neutral agents to illustrate the impact of risk-awareness. The following are scenarios in autonomous driving: a cross intersection (FIG. 6), an on-ramp merging maneuver (FIGS. 7A and 7B), and entering a roundabout (FIG. 8). Throughout this description, P1 and P2 are used to denote the two agents involved in the noted scenarios.

A. Cross Section

Figure 6:
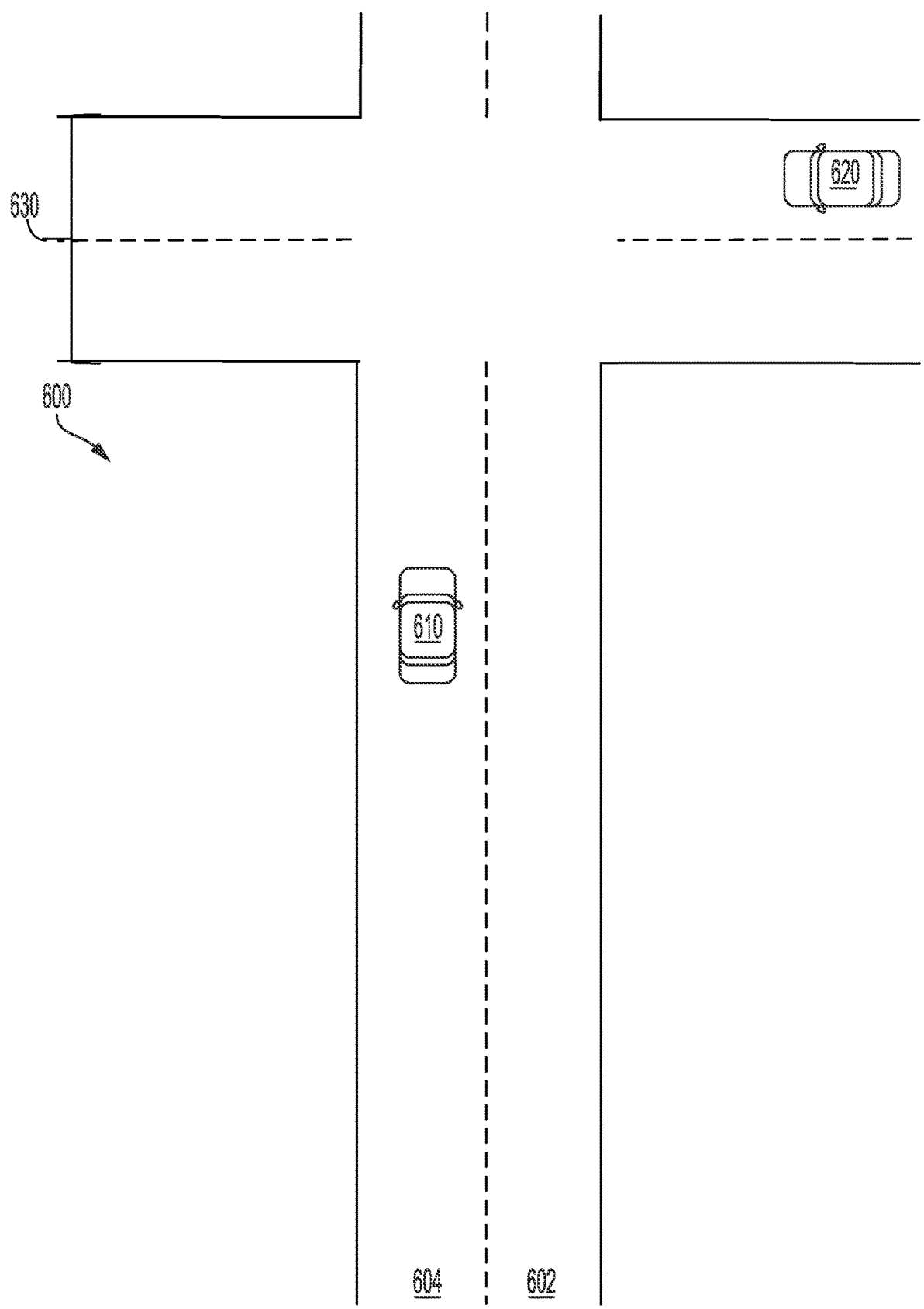
FIG. 6 is a diagram illustrating an overview of a traffic environment, including vehicles on roadway lanes prior to an intersection, according to aspects of the present disclosure.

FIG. 6 is a diagram illustrating an overview of a traffic environment, including vehicles on roadway lanes prior to an intersection, according to aspects of the present disclosure. The traffic environment includes a multilane roadway 600 (e.g., a two lane roadway), having a first lane 602 and a target lane 604 (e.g., a second lane), in which the target lane 604 includes an ego vehicle 610. In this configuration, the ego vehicle 610 is configured to monitor the dynamics of vehicles on the multilane roadway 600, such as a second vehicle 620 approaching an intersection 630 of the multilane roadway 600. In this example, the ego vehicle 610 may be the car 350, shown in FIG. 3.

In this example, the ego vehicle 610 and the second vehicle 620 are modeled as two risk-sensitive players, beginning from their starting positions and advances towards their goal positions of passing through the intersection 630 at a constant speed. This example is selected, such that without collision avoidance, the ego vehicle 610 and the second vehicle 620 will cross each other at a center point of the intersection 630. The dynamics of the ego vehicle 610 and the second vehicle 620 are modeled as two extended unicycles:

$$x = [p_1^x, p_1^y, v_1, \theta_1, p_2^x, p_2^y, v_2, \theta_2], u^i = [\alpha_i, \dot{\theta}_i], i = 1, 2.$$

A state vector x includes the position of the ego vehicle 610 and the second vehicle 620 (e.g., $p^x, p^y$), their speeds (e.g., $v_1, v_2$), and their headings (e.g., $\theta_1, \theta_2$). For each agent i, the control inputs are acceleration $\alpha_i$, and yaw rate $\dot{\theta}_i$. In this example, $g^i(x,t)$ is used to denote the cost function of each player, separated into tracking cost, control cost, and collision cost:

$$g^i(x, t) = g_{track}^i(x, t) g_{ctrl}^i(x, t) + g_{coll}^i(x, t),$$

with $$g_{track}^i(x, t) = \left(x_t - x_t^{ref}\right)^T W_t \left(x_t - x_t^{ref}\right),$$

$$g_{ctrl}^i(x, t) = \sum_j u_t^{jT} W_u^{ij} u_t^j,$$

$$g_{coll}^i(x, j) = W_c (a \cdot d + 1.0)^{-C},$$

where $W_t$, $W_u^{ij}$, $W_c$ are the weight matrices in each cost respectively, d is the distance between two players, and a, c are the collision cost parameters that penalize for unsafe distances. In this example, the risk tolerance of the two players $\theta_1$ and $\theta_2$ varies (e.g., from -5.0 (risk seeking) to +5.0 (risk-averse)). For each pair of risk tolerances $(\theta_1, \theta_2)$, multiple simulations are conducted, in which an additive random noise on velocity is added to both player dynamics during the simulations.

In this example, as the risk-sensitivity value of one player increases, the percentage of it yielding to the other player increases. Moreover, when the risk-sensitivity values of both players are the same, the yielding frequency is approximately fifty percent (50%) in this symmetric setup. Intuitively, aspects of the present disclosure recognize the relative risk sensitivity of agents, rather than the absolute risk sensitivity of agent influences on the qualitative behavior during the interaction. For example, as the relative risk-sensitivity increases, the average of minimum distance between two players also increases.

Aspects of the present disclosure recognize the importance of capturing risk when planning in the presence of uncertainties. As opposed to risk-aware agents, risk-neutral agents optimize for the expected cost value, and are insensitive to the level of noise. For risk-sensitive agents, the trajectories adapt to the noise level. Moreover, the minimum distance increases as the uncertainty increases. However, for the risk-neutral case, the control input is indifferent to noise.

Another aspect of the proposed process is the game-theoretic reasoning. By enabling autonomous agents to reason about their influence on other agents, overly-conservative behaviors are avoided, which results in higher efficiency. The proposed approach consistently spends less time to pass the intersection 630. The main reason for better efficiency of the proposed method is the fact that in the game-theoretic setting, each agent leverages its knowledge of the other agent's risk tolerance.

B. Merging

Figure 7A:
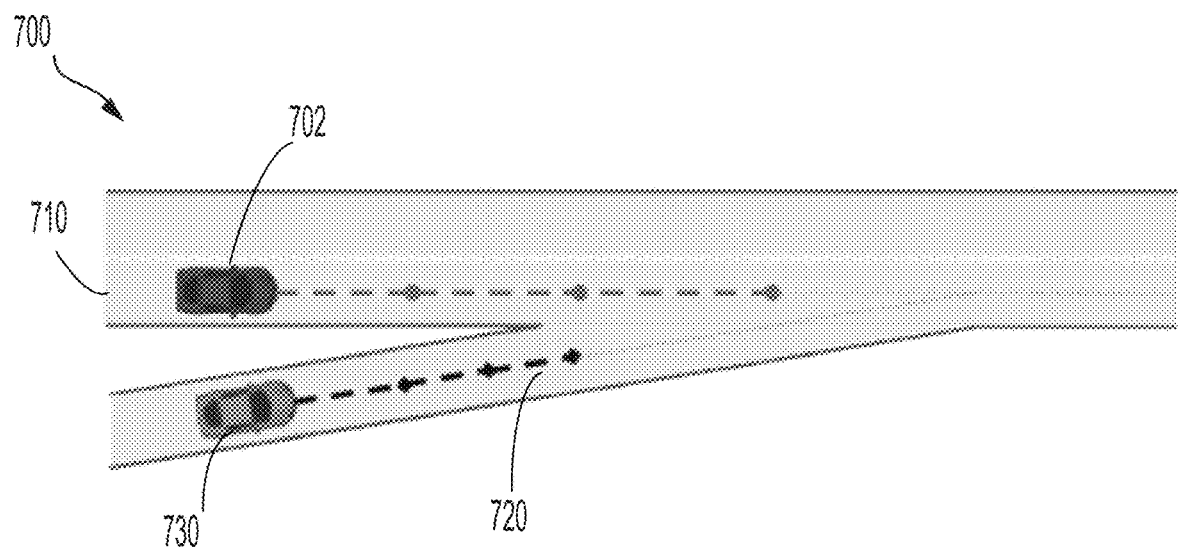
FIGS. 7A and 7B are diagrams illustrating an overview of a highway environment, including a vehicle on a highway main-lane and an ego vehicle on a highway on-ramp, according to aspects of the present disclosure.
Figure 7B:
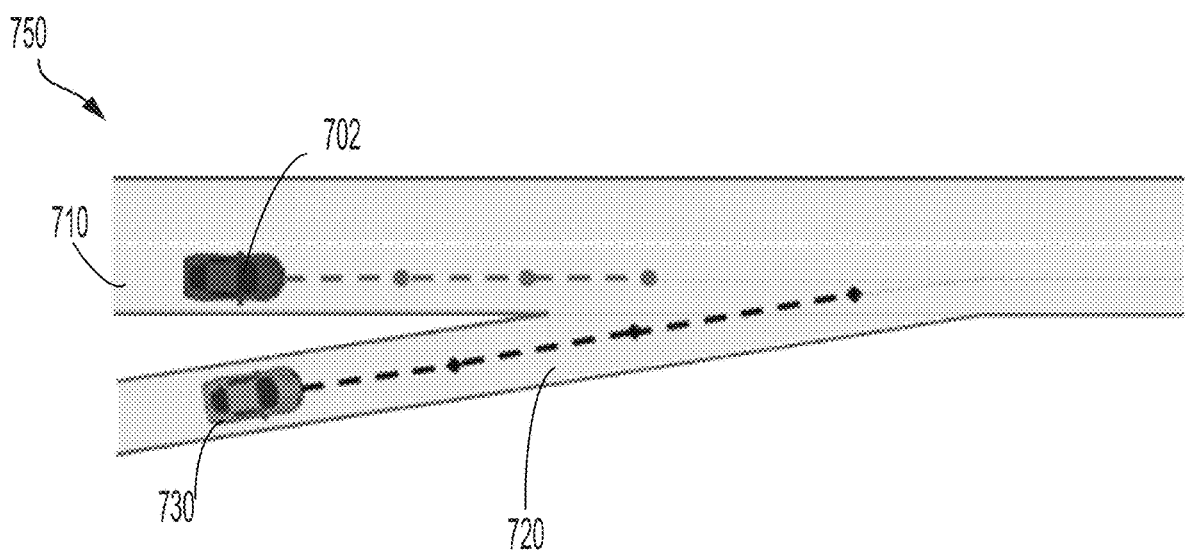
Figure 8:
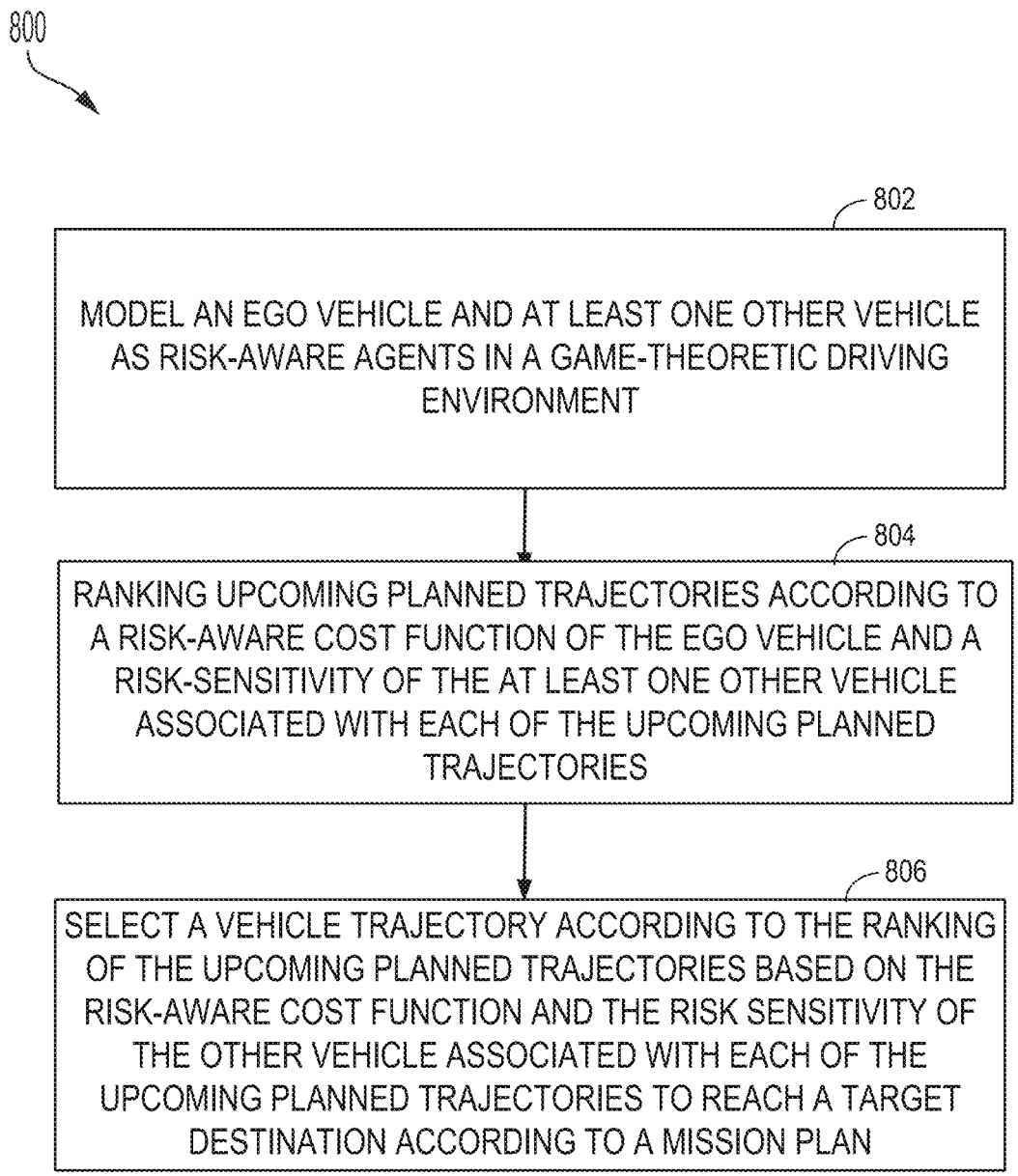
FIG. 8 is a flowchart illustrating a method risk-aware game-theoretic trajectory planning, according to aspects of the present disclosure.

FIGS. 7A and 7B are diagrams illustrating an overview of a highway environment, including a vehicle on a highway main-lane and an ego vehicle on a highway on-ramp, according to aspects of the present disclosure. The highway environments 700/750 include a highway main-lane 710 having the first vehicle 702, and a highway on-ramp 720 having an ego vehicle 730. In this configuration, the ego vehicle 730 is configured to monitor the dynamics of the first vehicle on the highway main-lane 710, including a risk-sensitivity of the first vehicle 702. In this example, the ego vehicle 730, may be the car 350, shown in FIG. 3.

This example considers a highway merging scenario with the ego vehicle 730 and the first vehicle 702. For example, the ego vehicle 730 starts from the highway on-ramp 720 and wants to merge onto the highway main-lane 710 with the presence of the first vehicle 702 in the highway main-lane 710 In the case where the first vehicle 702 and the ego vehicle 730 are close in longitudinal direction and exhibit a similar speed, successfully executing the merging maneuver is a challenging task. The challenge comes from the ambiguity that arises from the uncertainty of the future trajectory of the first vehicle 702 and the order of merging. Two possible interactions are illustrated in FIGS. 7A and 7B These scenarios are used to demonstrate the effect of relative risk-sensitivity during such challenging interactions.

The first vehicle 702 and the ego vehicle 730 are assumed to both follow the center line in their current driving lanes and consider the control of the vehicle's speed to finish the merging maneuver. In other words, a steering controller is executed separately for the first vehicle 702 and the ego vehicle 730 to remain in their lanes. A state of this merging scenario includes a 2D position and a speed of the first vehicle 702 and the ego vehicle 730:

$$x=[p_1^x, p_1^y, v_1, p_2^x, p_2^y, v_2]$$

The control input of each player is acceleration $u^1=a_1$, $u^2=a_2$. A same form of cost functions as in Equation (4) is assumed. In addition, an initial position and speed of the two players (e.g., the first vehicle 702 and the ego vehicle 730) are set so that they will collide if no control is applied. In this example, as the risk tolerances change, the patterns of yield/pass behaviors and minimum distance in the merging scenario are very similar to the intersection scenario of FIG. 6.

FIG. 8 is a flowchart illustrating a method for risk-aware game-theoretic trajectory planning, according to aspects of the present disclosure. A method 800 begins at block 802, in which an ego vehicle and at least one other vehicle are modeled as risk-aware agents in a game-theoretic driving environment. The driving environment may involve planned trajectories of the ego vehicle that are available to reach a target destination according to a mission plan. For example, as shown in FIG. 6, the ego vehicle 610 and the second vehicle 620 are modeled as two risk-sensitive players, beginning from their starting positions and advances towards their goal positions of passing through the intersection 630 at a constant speed. This example is selected, such that without collision avoidance, the ego vehicle 610 and the second vehicle 620 will cross each other at a center point of the intersection 630.

At block 804 of FIG. 8, ranking upcoming planned trajectories according to a risk-aware cost function of the ego vehicle and a risk-sensitivity of the at least one other vehicle associated with each of the upcoming planned trajectories. For example, as shown in FIGS. 7A and 7B, the risk-aware cost function is based on a state of this merging scenario and includes a 2D position and a speed of the first vehicle 702 and the ego vehicle 730:

$$x=,[p_1^x, p_1^y, v_1, p_2^x, p_2^y, v_2]$$

The control input of each player is acceleration $u^1=a_1$, $u^2=a_2$. A same form of cost functions as in Equation (4) is assumed. At block 806, a vehicle trajectory is selected according to the ranking of the upcoming planned trajectories based on the risk-aware cost function and the risk sensitivity of the other vehicle associated with each of the upcoming planned trajectories to reach the target destination according to the mission plan. This process includes adjusting a selected acceleration/braking value of the ego vehicle. As shown in FIGS. 7A and 7B, an initial position and speed of the two players (e.g., the first vehicle 702 and the ego vehicle 730) are set so that they will collide if no control is applied, which may be referred to as a current trajectory. In this example, as the risk tolerances change, the patterns of yield/pass behaviors and minimum distance in the merging scenario are very similar to the intersection scenario of FIG. 6.

The method 800 may include approximating feedback Nash equilibria of the risk-sensitive game-theoretic planning. The method 800 may also include deriving, at each iteration, a linearized approximation of system dynamics, and a quadratic approximation of the risk-aware cost function. The method 800 may further include solving a backward recursion for finding the feedback Nash equilibria of the risk-aware game-theoretic trajectory planning. This aspect of the present disclosure, leverages the use of an iterative approach to extend the solution of non-linear system dynamics and cost functions for a risk-sensitive dynamic game according to Equation (4). This proposed approach iteratively approximates the original nonlinear problem with linear dynamics and quadratic costs, and aims to approximate a Nash equilibrium in the sense of the approximated system.

Minimizing the risk-aware cost function increases the probability of a successful driving maneuver. The method 800 also includes computing risk-sensitive cost functions associated with the upcoming planned trajectories relative to the other vehicle. For example, the method 800 includes discarding an upcoming planned trajectory if the risk-aware cost function of the upcoming planned trajectory is greater than a predetermined value. The method 800 further includes discarding an upcoming planned trajectory or if the risk-sensitivity of the other vehicle corresponding to the upcoming planned trajectory is less than a predetermined value. The method 800 also includes planning a vehicle trajectory of the ego vehicle based on the risk-sensitive cost functions associated with the planned trajectories relative to the other vehicle and the risk-sensitivity of the other vehicle For example, as shown in FIG. 5, the vehicle controller (e.g., vehicle trajectory selection module 318 of FIG. 3) adjusts an acceleration/braking of the ego vehicle 550 to efficiently and smoothly merge from the first lane 502 to the target lane 504. The selecting of the vehicle trajectory in block 806 may also include discarding a tactical driving maneuver from the tactical driving maneuvers if the associated risk-aware cost function of the discarded upcoming planned trajectory is greater than other risk-aware cost function values of other upcoming planned trajectories, as shown in FIGS. 7A and 7B.

Aspects of the present disclosure are directed to a game-theoretic planning approach for risk-aware agents. The formulation of risk-sensitive dynamic games provides insights to the interaction between players. Compared to risk-neutral games, the proposed risk-aware framework introduces new parameters that lead to safer and more intuitive behaviors. The game aspect is also captured to address the mutual influence between agents. Compared with non-game risk-sensitive control, the proposed process achieves better efficiency without sacrificing safety. The proposed iterative linear exponential quadratic process is used to solve non-linear dynamic systems with nonlinear costs in real-time. The performance is demonstrated in several case studies, including a cross-intersection of FIG. 6, and an on-ramp merging maneuver, as shown in FIGS. 7A and 7B.

In some aspects, the method shown in FIGS. 7A and 7B may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102), and/or other components included therein of the autonomous vehicle 150 or the vehicle trajectory planning system 300.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for risk-aware game-theoretic trajectory planning, the method comprising:
   modeling an ego vehicle and at least a first vehicle and a second vehicle as risk-aware agents in a game-theoretic driving environment;
   exchanging risk-sensitivity information of the ego vehicle, the first vehicle, and the second vehicle using vehicle-to-vehicle (V2V) communication between the ego vehicle, the first vehicle, and the second vehicle;
   ranking upcoming planned trajectories according to a risk-aware cost function of the ego vehicle based on both a driving maneuver risk-sensitivity of the ego vehicle and a driving maneuver risk-sensitivity of the first vehicle and the second vehicle associated with each of the upcoming planned trajectories; and
   selecting a vehicle trajectory to enter a merge gap between the first vehicle and the second vehicle according to the ranking of the upcoming planned trajectories according to the risk-aware cost function and a determined padding distance based on both the driving maneuver risk-sensitivity of the ego vehicle and the driving maneuver risk-sensitivity of the first vehicle and the second vehicle associated with the selected vehicle trajectory to enter the merge gap including the determined padding distance between the first vehicle and the second vehicle and reach a target destination according to a mission plan.

2. The method of claim 1, in which modeling comprises:
   approximating a feedback Nash equilibria of a risk-aware game-theoretic trajectory planning;
   deriving, at each iteration, a linearized approximation of system dynamics and a quadratic approximation of the risk-aware cost function; and
   solving a backward recursion for finding the feedback Nash equilibria of the risk-aware game-theoretic trajectory planning.

3. The method of claim 1, in which ranking the upcoming planned trajectories comprises:
   computing risk-sensitive cost functions associated with the upcoming planned trajectories relative to both the driving maneuver risk-sensitivity of the ego vehicle and the driving maneuver risk-sensitivity of the first vehicle and the second vehicle; and
   planning the vehicle trajectory of the ego vehicle based on the risk-sensitive cost functions associated with the planned trajectories relative to the ego vehicle and the first vehicle and the second vehicle and the driving maneuver proximity-sensitivity of the ego vehicle and the first vehicle and the second vehicle.

4. The method of claim 3, further comprising accelerating a speed of the ego vehicle to successfully merge into a target lane of a multilane roadway including the first vehicle and the second vehicle.

5. The method of claim 3, further comprising decelerating a speed of the ego vehicle to successfully merge into a target lane of a multilane roadway including the first vehicle and the second vehicle.

6. The method of claim 5, in which the ego vehicle is on an on-ramp of the multilane roadway and the target lane is a first lane of the multilane roadway.

7. The method of claim 1, further comprising discarding an upcoming planned trajectory if the risk-aware cost function of the upcoming planned trajectory is greater than a predetermined value.

8. The method of claim 1, further comprising discarding an upcoming planned trajectory if the driving maneuver risk-sensitivity of the ego vehicle and the first vehicle and the second vehicle corresponding to the upcoming planned trajectory are less than a predetermined value.

9. A non-transitory computer-readable medium having program code recorded thereon for risk-aware game-theoretic trajectory planning, the program code being executed by a processor and comprising:
   program code to model an ego vehicle and at least a first vehicle and a second vehicle as risk-aware agents in a game-theoretic driving environment;
   program code to exchange risk-sensitivity information of the ego vehicle, the first vehicle, and the second vehicle using vehicle-to-vehicle (V2V) communication between the ego vehicle, the first vehicle, and the second vehicle;
   program code to rank upcoming planned trajectories according to a risk-aware cost function of the ego vehicle based on both a driving maneuver risk-sensitivity of the ego vehicle and a driving maneuver risk-sensitivity of the first vehicle and the second vehicle associated with each of the upcoming planned trajectories; and
   program code to select a vehicle trajectory to enter a merge gap between the first vehicle and the second vehicle according to the ranking of the upcoming planned trajectories according to the risk-aware cost function and a determined padding distance based on both the driving maneuver risk-sensitivity of the ego vehicle and the driving maneuver risk-sensitivity of the first vehicle and the second vehicle associated with the selected vehicle trajectory to enter the merge gap including the determined padding distance between the first vehicle and the second vehicle and reach a target destination according to a mission plan.

10. The non-transitory computer-readable medium of claim 9, in which the program code to model comprises:
    program code to approximate a feedback Nash equilibria of the risk-aware game-theoretic trajectory planning;
    program code to derive, at each iteration, a linearized approximation of system dynamics and a quadratic approximation of the risk-aware cost function; and
    program code to solve a backward recursion for finding the feedback Nash equilibria of the risk-aware game-theoretic trajectory planning.

11. The non-transitory computer-readable medium of claim 9, in which the program code to rank the upcoming planned trajectories comprises:
    program code to compute risk-sensitive cost functions associated with the upcoming planned trajectories relative to both the driving maneuver risk-sensitivity of the ego vehicle and the driving maneuver risk-sensitivity of the first vehicle and the second vehicle; and
    program code to plan the vehicle trajectory of the ego vehicle based on the risk-sensitive cost functions associated with the upcoming planned trajectories relative to the ego vehicle and the first vehicle and the second vehicle and the driving maneuver risk-sensitivity of the ego vehicle and the first vehicle and the second vehicle.

12. The non-transitory computer-readable medium of claim 11, further comprising program code to accelerate a speed of the ego vehicle to successfully merge into a target lane of a multilane roadway including the first vehicle and the second vehicle.

13. The non-transitory computer-readable medium of claim 11, further comprising program code to decelerate a speed of the ego vehicle to successfully merge into a target lane of a multilane roadway including the first vehicle and the second vehicle.

14. The non-transitory computer-readable medium of claim 13, in which the ego vehicle is on an on-ramp of the multilane roadway and the target lane is a first lane of the multilane roadway.

15. The non-transitory computer-readable medium of claim 9, further comprising program code to discard an upcoming planned trajectory if the risk-aware cost function of the upcoming planned trajectory is greater than a predetermined value and/or if the driving maneuver risk-sensitivity of the ego vehicle and the first vehicle and the second vehicle corresponding to the upcoming planned trajectory are less than a predetermined value.

16. A system on chip (SoC) for risk-aware game-theoretic trajectory planning, the SoC comprising:
   a game-theoretic risk model configured to model an ego vehicle and at least a first vehicle and a second vehicle as risk-aware agents in a game-theoretic driving environment;
   a communications module to exchange risk-sensitivity information of the ego vehicle, the first vehicle, and the second vehicle using vehicle-to-vehicle (V2V) communication between the ego vehicle, the first vehicle, and the second vehicle;
   a risk-aware cost function module configured to rank upcoming planned trajectories according to a risk-aware cost function of the ego vehicle based on both a driving maneuver risk-sensitivity of the ego vehicle and a driving maneuver risk-sensitivity of the first vehicle and the second vehicle associated with each of the upcoming planned trajectories; and
   a vehicle trajectory selection module configured to select a vehicle trajectory to enter a merge gap between the first vehicle and the second vehicle according to the ranking of the upcoming planned trajectories according to the risk-aware cost function and a determined padding distance based on both the driving maneuver risk-sensitivity of the ego vehicle and the driving maneuver risk-sensitivity of the first vehicle and the second vehicle associated with the selected vehicle trajectory to enter the merge gap including the determined padding distance between the first vehicle and the second vehicle and reach a target destination according to a mission plan.

17. The SoC of claim 16, further comprising an ego perception module to determine a current trajectory of the ego vehicle and the current trajectory of the first vehicle and the second vehicle.

18. The SoC of claim 17, further comprising a vehicle trajectory planner to plan the upcoming planned trajectories of the ego vehicle according to the current trajectory of the ego vehicle and the current trajectory of the first vehicle and the second vehicle.

19. The SoC of claim 16, in which the game-theoretic risk model is configured:
   to approximate a feedback Nash equilibria of the risk-aware game-theoretic trajectory planning;
   to derive, at each iteration, a linearized approximation of system dynamics and a quadratic approximation of the risk-aware cost function; and
   to solve a backward recursion for finding the feedback Nash equilibria of the risk-aware game-theoretic trajectory planning.

* * * * *